(12) United States Patent
Hansen

(10) Patent No.: US 6,182,495 B1
(45) Date of Patent: Feb. 6, 2001

(54) TEST MACHINE FOR SIMULATION OF SHOCK WAVE INDUCED MOTION

(75) Inventor: Eric C. Hansen, Norfolk, VA (US)

(73) Assignee: The United States of America as represented by the Secretary of the Navy, Washington, DC (US)

( * ) Notice: Under 35 U.S.C. 154(b), the term of this patent shall be extended for 0 days.

(21) Appl. No.: 09/320,568

(22) Filed: May 27, 1999

(51) Int. Cl.⁷ ...................................... G01M 7/00
(52) U.S. Cl. ................ 73/12.01; 73/12.07; 73/12.08; 73/12.09
(58) Field of Search ................ 73/12.01, 12.07, 73/12.08, 12.09

(56) References Cited

U.S. PATENT DOCUMENTS 3,693,421 * 9/1972 Karper et al. ............................ 73/12
4,513,402 * 4/1985 Devaure ................................. 73/12

* cited by examiner

Primary Examiner—Benjamin R. Fuller
Assistant Examiner—Maurice Stevens
(74) Attorney, Agent, or Firm—John Forrest; Jacob Shuster

(57) ABSTRACT

Equipment to be carried on marine vessels during sea travel, is mounted on the table of a test machine through which shock wave induced motion to be experienced by such equipment during the sea travel is simulated and applied to the equipment carrying table by means of coil springs. Such simulated motion is initiated from a position of the table to which it is displaced and from which it is selectively released through a latch device.

6 Claims, 2 Drawing Sheets

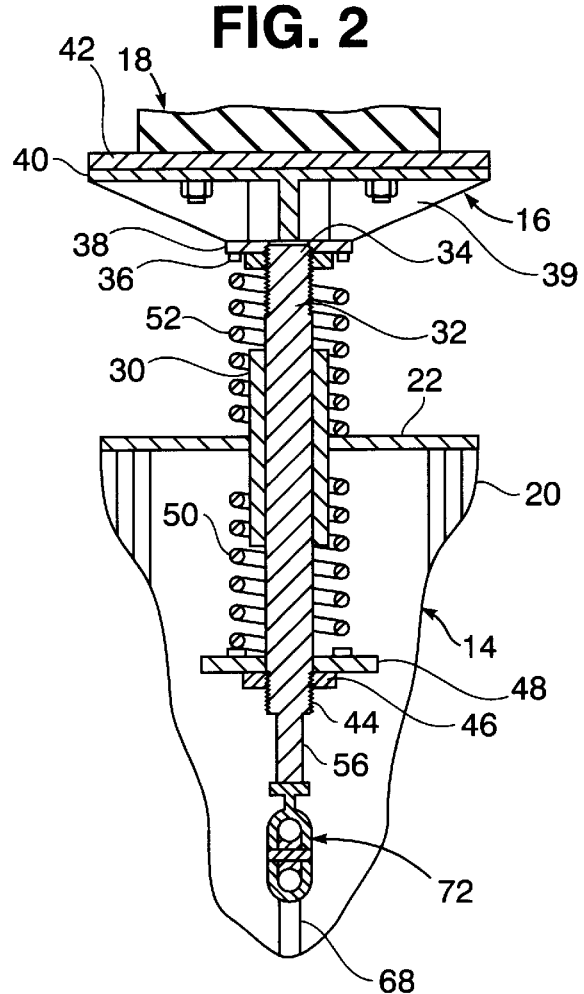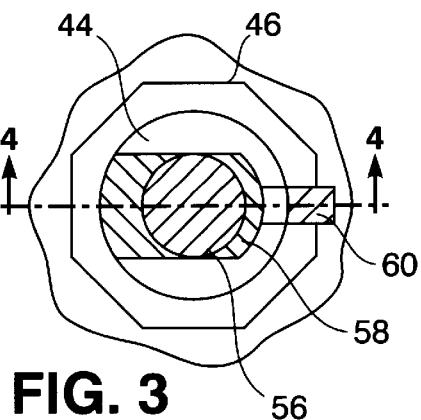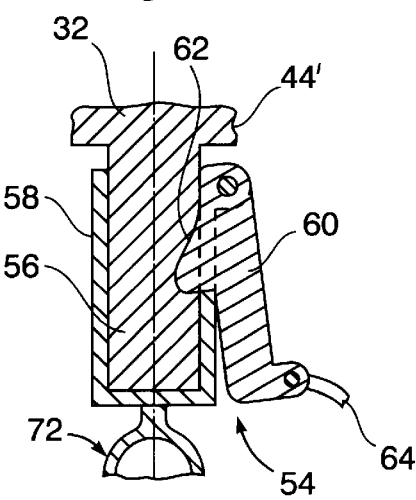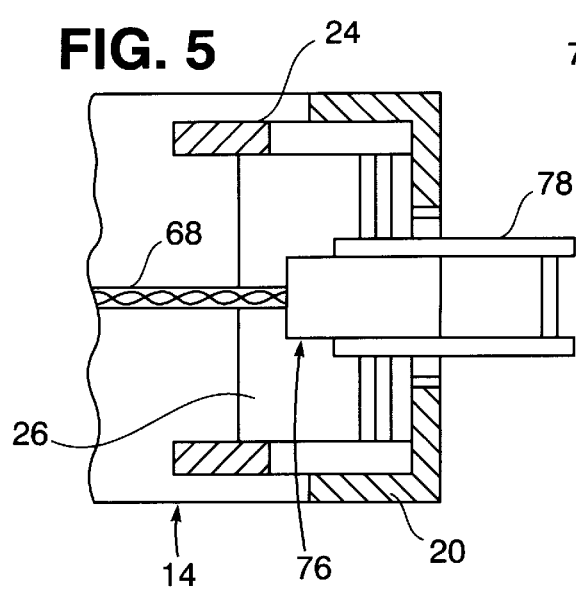

TEST MACHINE FOR SIMULATION OF SHOCK WAVE INDUCED MOTION

The present invention relates in general to testing the physical impact on equipment from expected shock wave induced disturbances.

BACKGROUND OF THE INVENTION

Various commercial "off the shelf" items are available on an economical basis for installation within environments subject to motion induced disturbance, such as equipment mounted on naval marine vessels including ships and submarines experiencing shock wave induced motions during sea travel. Such equipment, however, often lacks sufficient reliability following the impact imposed by the shock wave motions. It is therefore an important object of the present invention to provide economical test means through which typical shock wave induced motion may be simulated and applied to samples of such equipment in order to identify deficiencies therein that may be overcome by relatively minor hardware modification.

SUMMARY OF THE INVENTION

In accordance with the present invention, a test machine is provided having a table on which the sample equipment is mounted. Such table is vertically displaceable in opposite directions on a stand of the test machine b a pair of coil springs under axial compression. Compression of the upper coil spring is initially established by pulling the table down a prescribed distance from a neutral to an operational position. The table is then selectively released by unlatching to allow it to rebound between the upper and lower coil springs for several cycles producing a vertical sinusoidal motion dependent on various factors which are adjustable so as to simulate shock wave induced motions experienced by equipment on a wide variety of marine vessels during sea travel.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein:

FIG. 2 is a partial section view taken substantially through a plane indicated by section line 2—2 in FIG. 1;

FIG. 3 is a transverse section view taken substantially through a plane indicated by section line 3—3 in FIG. 1;

FIG. 4 is a partial section view taken substantially through a plane indicated by section line 4—4 in FIG. 3; and FIG. 5 is a partial transverse section view taken substantially through a plane indicated by section line 5—5 in FIG. 1.

DETAILED DESCRIPTION OF PREFERRED EMBODIMENT

Figure 1:
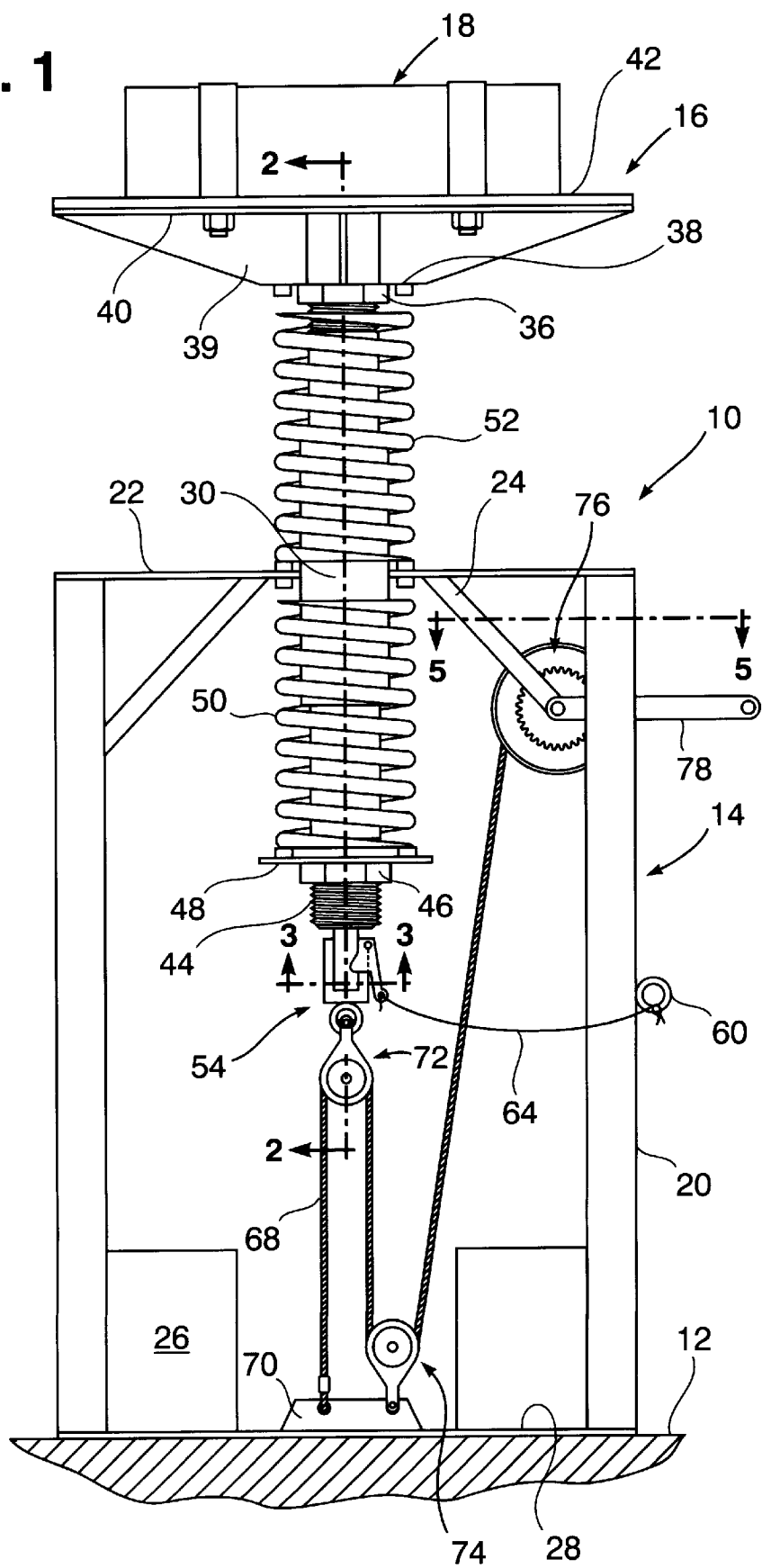
FIG. 1 is side elevation view of a test machine constructed in accordance with one embodiment of the invention.

Referring now to the drawing in detail, FIG. 1 illustrates a test machine generally referred to by reference numeral 10, placed on some horizontal support surface 12. The test machine 10 comprises a stand, generally referred to by reference numeral 14, resting on the support surface 12, and a horizontal table 16 mounted on the stand 14 for gravitationally vertical movement while carrying thereon an item 18 of equipment to be tested.

As shown in FIGS. 1, 2 and 5, the stand 14, made from steel parts, comprises four angle corner legs 20 interconnected at their upper ends with a rectangular top plate 22. Stiffener bars 24 are interconnected between the top plate 22 and the corner legs 20 adjacent to their upper ends, while weights 26 are received between the legs at their lower ends on a bottom plate 28 to which the corner legs are also connected.

Centrally secured to the top plate 22 of the stand 14 by welding is a tubular guide sleeve 30 which extends vertically above and below the top plate 22 for slidable support of the table 16 by means of a cylindrical support rod 32 received therein and to which the table is adjustably fixed at its upper threaded end portion 34 by means of a lock nut 36 in abutment with a lower spacer element 38 of the table, having triangular reinforcement ribs 39 extending upwardly therefrom to a horizontal table top 40. A steel plate 42 is placed on and removable secured to the table top 40 underlying the equipment sample 18 to adjust weight and response factors of the test machine.

The lower threaded end portion 44 of the table support rod 32 has a gap adjustment nut 46 positioned thereon in abutment with a disc 48 on which a lower axial end of a lower coil spring 50 rests as shown in FIGS. 1 and 2. Such lower coil spring 50 is in axial alignment with an upper coil spring 52 encircling the guide sleeve 30 and in abutment with the top plate 22 of the stand 14.

The lower axial end of the table support rod 32 is connected to a latch device 54 through which the table 16 is releasably held in a neutral position as shown in FIGS. 1–4, with the upper coil spring 52 disposed between the top plate 22 of the stand 14 and the table spacer element 38. The latch device 54 as shown in FIG. 4 includes a cylindrical coupling pin 56 projecting downwardly from the lower end of the table support rod 32 into a hasp 58 on which a latch element 60 is pivotally mounted for projection into a recess 62 formed in the pin 56. The latch device 54 is selectively released by pulling on a release actuating string 64 connected to the lower end of the latch element 60 and anchored by a ring 66 to a corner leg 20 of the stand 14 as shown in FIG. 1. Pivotal disengaging withdrawal of the latch element 60 from the recess 62 in the pin 56 by pull on the release string 64 will accordingly release the rod 32 for vertical displacement under spring pressure as hereinafter explained.

The table support rod 32 is selectively displaced downwardly a predetermined distance from the neutral position to an operational position by some suitable actuating mechanism which may include an elongated cable 68 fixed at one end to an anchor 70 on the bottom plate 28 of the stand 14 as shown in FIG. 1. Such cable 68 extends from the anchor 70 through pulley 72, carried on the lower end of the latch device 54, and through a pulley 74 pivotally connected to the anchor 70, to a cable winch 76 mounted between two legs 20 of the stand. The winch 76 has an actuating lever 78 extending therefrom for selective displacement of the cable 68. The table 16 is thereby vertically displaced through cable 68 between the neutral and operational positions in which it is releasably held by latch device 54. In the neutral position, neither of the coil springs 50 and 52 are under compression for an arrangement involving zero preload for example. By downward vertical displacement of rod 32 and the table 16 attached thereto at its upper end by a prescribed distance from such neutral position to the operational position, the upper coil spring 52 is axially compressed between the top plate 22 of the stand and the bottom spacer element 38 of the table 16. Selective release of the table support rod 32 from the cable 68 in such operational position through release of the latch device 54, by pulling release string 64, will accordingly initiate vertical motion of the table 16 under the compression of the upper coil spring 52 causing compression of the lower coil spring 50 during upward rebound for several cycles. Simple adjustment of the springs 50 and 52 and preloads is accomplished through the nut 46 on the lower end portion 44 of the rod 32 which allows quick disassembly for changing the springs and setting the axial gap therebetween on the guide sleeve 30. The test machine 10 is thereby easily and inexpensively calibrated to match many types of shock isolation mounts for equipment aboard different size marine vessels.

Obviously, other modifications and variations of the present invention may be possible in light of the foregoing teachings. It is therefore to be understood that within the scope of the appended claims the invention may be practiced otherwise than as specifically described.

What is claimed is:

1. A machine for testing equipment by imparting thereto movement simulating shock wave induced motion to be experienced by said equipment, comprising: a table on which said equipment is mounted; a stand on which the table is guidingly supported while undergoing said movement with the equipment thereon; spring means mounted on the stand for imparting said movement to the table upon release from an operational position; actuating means for selective displacement of the table to said operational position at which the spring means is rendered effective to impart said movement; and latch means operatively interconnecting the actuating means with the table for releasable holding the table in said operational position from which the movement simulating the shock wave induced motion is mechanically initiated by said release of the table from the operational position.

2. The machine as defined in claim 1, wherein said spring means comprises a pair of coil springs alternatively compressed between the stand and the table for cyclically inducing said movement in opposite directions stimulating the shock waves.

3. The machine as defined in claim 2, including a vertical support rod slidably mounted by the stand on which said pair of coil springs are disposed in axial alignment with each other; and means adjustably connecting opposite axial end portions of the support rod respectively to the table and to the actuating means through the latch means for adjustment of spring compression and said selective displacement of the table by the actuating means.

4. The machine as defined in claim 1, including a support rod slidably mounted by the stand on which said spring means is disposed; and means adjustably connecting opposite axial end portions of the support rod respectively to the table and to the actuating means through the latch means for adjustment of spring compression and said selective displacement of the table.

5. A machine for testing equipment by imparting thereto movement simulating shock wave induced motion, including: a table on which said equipment is mounted; spring means for imparting said movement to the table;

actuating means for selective displacement of the table to a position at which the spring means is rendered effective to impart said movement; and latch means operatively interconnecting the actuating means with the table for releasable holding thereof in said position from which the movement is initiated; a support rod; and means adjustably connecting opposite axial end portions of the support rod respectively to the table and to the actuating means through the latch means for adjustment of spring compression and said selective displacement of the table by the actuating means; said latch means comprising: a coupling pin projecting axially from one of the opposite axial end portions of the support rod; a pin receiving hasp connected to the actuating means and having a movable latch element mounted thereon in engagement with the pin to interconnect the support rod with the actuating means; and release means connected to the latch element for selective disengagement thereof from the pin.

6. A machine for testing equipment to be mounted on a marine vessel by imparting thereto vertical movement simulating shock wave induced motion to be experienced by said equipment during sea travel on the marine vessel, comprising: a table on which said equipment is mounted; a stand on which the table is guidingly supported while undergoing said vertical movement with the equipment thereon; spring means mounted on the stand for imparting said vertical movement to the table; actuating means for selective displacement of the table to a position at which the spring means is rendered effective to impart said vertical movement; and latch means operatively interconnecting the actuating means with the table for releasable holding thereof in said position from which the vertical movement is initiated; a vertical support rod slidably mounted by the stand on which said spring means is disposed; and means adjustably connecting opposite axial end portions of the support rod respectively to the table and to the actuating means through the latch means for adjustment of spring compression and said selective displacement of the table; said latch means comprising: a coupling pin projecting axially from a lower one of the opposite axial end portions of the support rod; a pin receiving hasp connected to the actuating means and having a movable latch element mounted thereon in engagement with the pin to interconnect the support rod with the actuating means; and release means connected to the latch element for selective disengagement thereof from the pin.

* * * * *